(12) United States Patent
Wenzel et al.

(10) Patent No.: US 9,255,352 B2
(45) Date of Patent: Feb. 9, 2016

(54) APPARATUS FOR STITCHING VEHICLE INTERIOR COMPONENTS

(71) Applicants: Edward J. Wenzel, Troy, MI (US); Ramez M. Habhab, Rochester Hills, MI (US)

(72) Inventors: Edward J. Wenzel, Troy, MI (US); Ramez M. Habhab, Rochester Hills, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 14/338,402

(22) Filed: Jul. 23, 2014

(65) Prior Publication Data

US 2015/0033996 A1 Feb. 5, 2015

Related U.S. Application Data

(60) Provisional application No. 61/860,604, filed on Jul. 31, 2013.

(51) Int. Cl.
*D05C 7/04* (2006.01)
*D05B 1/06* (2006.01)

(52) U.S. Cl.
CPC ... *D05C 7/04* (2013.01); *D05B 1/06* (2013.01)

(58) Field of Classification Search
CPC .......... D05C 7/04; D05C 7/00; D05B 37/063; D05B 37/066
See application file for complete search history.

(56) References Cited

U.S. PATENT DOCUMENTS

| 881,894 | A | * | 3/1908 | Braun | D05C 7/04 |
| | | | | | 112/89 |
| 1,842,838 | A | | 1/1932 | Poole | |
| 3,948,194 | A | * | 4/1976 | Gunold | D05B 3/04 |
| | | | | | 112/130 |
| 4,077,340 | A | * | 3/1978 | Braun | B29C 65/56 |
| | | | | | 112/131 |
| 8,272,341 | B2 | * | 9/2012 | Konig | D05B 37/04 |
| | | | | | 112/128 |
| 2010/0050913 | A1 | | 3/2010 | Meeker | |

FOREIGN PATENT DOCUMENTS

| BY | 16823 C1 | 2/2013 |
| SU | 903411 A1 | 2/1982 |

OTHER PUBLICATIONS

International Search Report for International Application No. PCT/US2014/048400 dated Dec. 18, 2014.
Written Opinion for International Application No. PCT/US2014/048400 dated Dec. 18, 2014.

\* cited by examiner

*Primary Examiner* — Danny Worell
(74) *Attorney, Agent, or Firm* — Cantor Colburn LLP

(57) ABSTRACT

An apparatus for stitching a component is provided. The apparatus includes an awl bar assembly coupled to a first drive device. The awl bar assembly is moved from a first position to a second position along the stitch path with an external drive device. A second drive device is coupled to the first drive device. A needle bar assembly is provided having a needle. The needle moves between an inserted and a withdrawn position, the needle bar assembly being pivotally coupled to the second drive device, the needle bar assembly moves from the first position to the second position with the same external drive device driving the awl bar assembly. A biasing member is coupled to the needle bar assembly, the biasing member being arranged to pivot and align the needle bar assembly in the second position in response to the needle bar being moved to the withdrawn position.

20 Claims, 2 Drawing Sheets

APPARATUS FOR STITCHING VEHICLE INTERIOR COMPONENTS

CROSS-REFERENCE TO RELATED APPLICATIONS

The present application is a non-provisional application of U.S. Provisional Application 61/860,604 filed on Jul. 31, 2013, the contents of which are incorporated by reference herein in their entirety.

BACKGROUND

The subject matter disclosed herein relates to an apparatus for sewing sections of material and, more particularly, to an apparatus for sewing vehicle interior components Currently, most stitching found in an automotive interior is of the functional variety, wherein two or more pieces of material (leather, vinyl, TPO, cloth, etc) are cut from a pattern and sewn together (cut-n-sew) prior to being wrapped around a component such as a seat cushion, head rest, arm rest, console lid, instrument panel substrate, etc. Such functional stitching is very labor intensive and is normally used only where required on low and mid-class vehicles. Functional stitching on decorate components such as instrument panel retainers and door panels has typically been restricted to higher class vehicles due to cost.

In recent years, automotive original equipment manufacturers (OEMs) have shown an interest in applying the "stitched" look to more vehicles over a wider range of price classes. A simulated non-functional stitch has been used in some applications; however, the ability to offer a simulated stitch in a contrasting color is not production feasible at this time. Additionally, more OEMs are requested that a real or "live" stitch be used on decorate components to provide the look and feel of a true cut-n-sew component.

Thus, it is desirable to provide a live, non-functional stitch on decorative automotive trim components without using costly cut-n-sew technology. One method of providing this feature is to stitch a pattern on an unformed single or multi-layer construction of trim material and wrap the sewn trim sheet around a preformed/precut substrate. However, as the part complexity and size increase this becomes impractical as unformed trim material can only be applied to relatively flat surfaces.

Another option includes stitching a pattern on a preformed single or multilayer construction of trim material and bond the sewn trim preform to a preformed molded substrate. However, this requires that the size and shape of the preformed & stitched skin match that of the molded substrate nearly perfect. This method may require that all surfaces in die draw have adequate draft in order to accommodate nesting without damage to the preform. All undercuts using this method require automated or manual edge wrapping to finish.

A third method includes stitching a pattern on a flat or relatively flat single or multilayer trim & substrate component construction. This method eliminates the fit and finish issues associated method discussed above, but is limited by the ability of the sewing machine to reach confined areas of the part while possessing the capability to drive a needle through trim and substrate material of the component. Likewise, any backside features (ribbing, bosses, etc.) required for component structure or attachment cannot be located in the area directly behind/beneath the stitch path.

A fourth method includes stitching a pattern on a preformed single or multilayer trim & substrate component construction. The apparatus for performing this method consists of the use of a chain stitch sewing machine that uses an awl on the upper portion of the head to penetrate the trim and substrate of the interior component. After the awl exits the hole it produced in the component a needle with hook protrudes through the hole from the lower arm of the machine to grasp the thread held in position by the thread tensioner arm. Once hooked, the thread is pulled through the hole and through the loop from the previous stitch. The needle also advances the part to the next point of awl penetration as it pulls the thread down through the hole. The needle then advances to the hook position once again while the awl is engaged with the part so the part does not move and needle can move through the newly formed hole without hesitation once the awl exits the part.

However, if a small thru-plane radius must be sewn with the needle & awl design as described above, it becomes challenging to accommodate needle removal from the part as well as ensure proper alignment with the subsequent hole produced by the awl. As a result, needle damage or part mis-location during sewing may occur.

Accordingly, while existing sewing apparatus for vehicle interiors have been suitable for their intended purpose the need for improvement remains, particularly in providing a sewing apparatus that allows for a cut-n-sew appearance in a cost effective manner.

BRIEF DESCRIPTION OF THE INVENTION

According to one aspect of the invention, an apparatus for stitching an interior component is provided. The apparatus includes a first drive device and an awl bar assembly coupled to the first drive device. The awl is configured to be moved from a withdrawn position to an inserted position with the first drive device. A second drive device is operably coupled to the first drive device. A needle bar assembly is provided having a needle, the needle movable between an inserted and a withdrawn position, the needle bar assembly being pivotally coupled to the second drive device. A biasing member is coupled to the needle bar assembly, the biasing member being arranged to pivot and align the needle bar assembly in the second position in response to the needle being moved to the withdrawn position.

According to another aspect of the invention, an apparatus for stitching an interior component. The apparatus includes a first drive device and an awl coupled the first drive device and sized to form an opening in the interior component. The awl configured to be moved from a first position to a second position with an external drive device such as a robot or other automated means of transport. A thread tensioner arm is coupled to the first drive device adjacent the awl bar. A second drive device is operably coupled to the first drive device. A needle bar assembly is provided having a needle, the needle movable between an inserted and a withdrawn position, the needle bar assembly being pivotally coupled to the second drive device. The needle bar assembly configured to be moved from the first position to the second position independent from the awl bar assembly. A biasing member is coupled to the needle bar assembly, the biasing member being arranged to pivot the needle bar assembly into alignment with the opening formed by the awl bar at the second position, the biasing member pivoting the needle bar assembly in response to the needle bar being moved to the withdrawn position.

According to yet another aspect of the invention, a method of stitching an interior component is provided. The method includes forming a first hole with an awl, the awl coupled to a first drive device. A needle is inserted into the opening, the needle coupled to a needle bar assembly, the needle bar assembly being pivotally coupled to a biasing member. The needle bar assembly is moved at a first time from a first position to a second position with an external drive device such as a robot or other automated means of transport while the needle bar is in the first hole. The awl is moved at a second time to the second position with an external drive device such as a robot or other automated means of transport, the second time being different from the first time. A second hole is formed at the second position with the awl via a first drive device. The needle is moved from the first hole to a withdrawn position via a second drive device. The needle bar assembly is pivoted when the needle bar is removed from the first hole to align the needle bar with the second hole via a biasing member.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
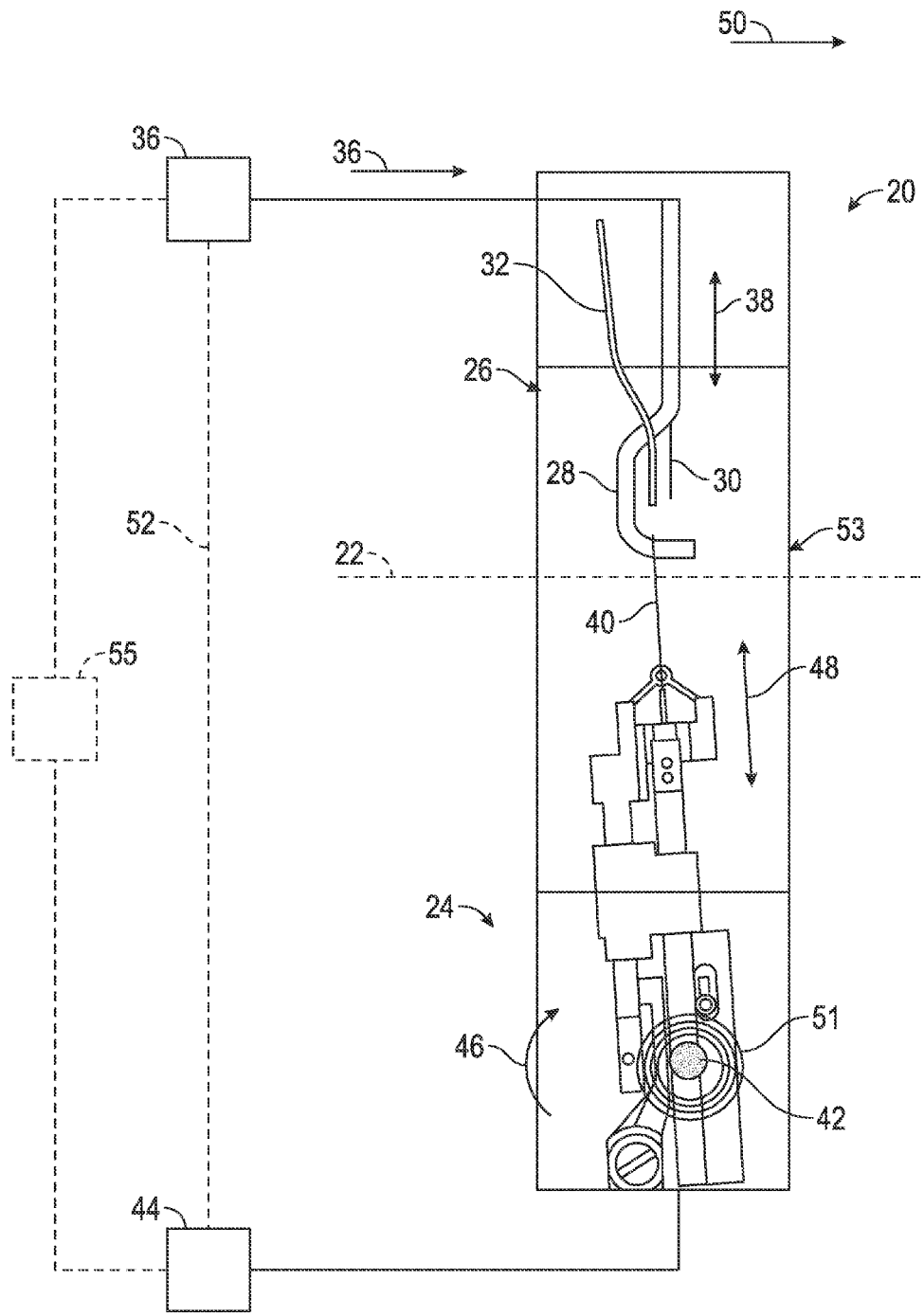
FIG. 1 is a side illustration of a sewing apparatus in accordance with an embodiment of the invention.

The detailed description explains embodiments of the invention, together with advantages and features, by way of example with reference to the drawings.

DETAILED DESCRIPTION OF THE INVENTION

Embodiments of the present invention provide advantages in allowing for a cost effective and reliable means of applying stitching to a vehicle interior component. Still further embodiments provide advantages in decoupling the movement of the awl from that of the needle. By decoupling the movement, embodiments of the present invention provide still further advantages in the sewing of small thru-plane radius. Embodiments of the present invention also reduce or eliminate the movement of the vehicle interior component during the sewing operation.

Turning now to the drawings, wherein to the extent possible like reference numerals are utilized to designate like components throughout the various views, an interior component 22 of a vehicle (not shown) is illustrated. In one implementation interior component 22 is a portion of an instrument panel of a vehicle. Also illustrated, is an apparatus for stitching the interior component.

The interior component may be a single layer or multi-layered construction. In one embodiment, the interior component includes at least an outer skin layer having a substantially smooth outer surface and an underside facing away from the outer surface. The outer skin layer is preferably formed of a plastic material of substantial flexibility and aesthetically pleasing character. In one embodiment, the interior component is a decorative element of a vehicle interior.

In order to enhance the softness of interior component and in one embodiment, a layer of cushioning support material may be provided in the region below the outer skin layer. It is contemplated that the cushioning support material may be of any number of different constructions although a foamed material such as cross linked polypropylene (XLPP) foam may be potentially preferred. A substrate panel of dimensionally stable plastic or other suitable material can also be disposed below the cushioning support material.

According to one potentially preferred embodiment, the cushioning support material and the substrate panel serve cooperatively to provide a support structure for the outer skin layer.

It is contemplated that foam forming the cushioning support material may be blown (i.e. polyurethane) between the outer skin layer and the substrate panel so as to form a multi-layered composite structure. It is also contemplated that the cushioning material (XLPP) may be attached to the outer skin layer in a preliminary cladding operation so as to form a preliminary layered composite which may thereafter be applied across any substrate panel as may be utilized.

Still further, the interior piece or decorative element may be anyone of a single layer (skin only), a double layer (skin/foam) or a triple layer (skin/foam/substrate). Accordingly, the apparatus disclosed herein in contemplated as being used with anyone of the aforementioned interior piece configurations.

Referring now to FIG. 1, a sewing apparatus 20 is shown for forming stitches in an interior component 22. In one embodiment, the interior component 22 is an interior trim piece for a vehicle (not shown). In another embodiment, the interior trim piece is an instrument panel of the vehicle. The apparatus 20 includes a housing 53 which contains a needle bar assembly 24 arranged on one side of the interior component 22 and a awl bar assembly 26 on the opposite side of the interior component 22. The awl bar assembly 26 includes a movable walking foot 28, an awl 30 and a thread tensioner arm 32. As will be discussed in more detail below, the walking foot 28, the awl 30 and thread tensioner arm 32 are coupled to a first drive device 34. The first drive device 34 is configured to move the walking foot 28 and the awl 30 in one direction indicated by arrow 38 during operation. The first drive device 34 is also configured to move the thread tensioner arm 32 between positions to wrap thread around a needle during operation.

The needle bar assembly 24 includes a needle 40 that moves between an inserted position (FIG. 1) and a withdrawn position (FIG. 2, t=4) along the direction indicated by arrow 48. The needle bar assembly 24 is coupled by a pivot 42 to a second drive device 44. A biasing member 51 is coupled to the needle bar assembly 24 to bias the needle bar assembly about the pivot 42 in the direction indicated by arrow 46. In one embodiment, the biasing member 51 is a torsion spring disposed about the pivot 42. The second drive device 44 moves the needle bar in the direction indicated by arrow 48. In one embodiment, the needle 40 moves along an axis that extends through the center of the pivot 42.

It should be appreciated that the first drive device 34 and the second drive device 44 may be any suitable device capable of moving the needle bar assembly 24 and awl bar assembly 26 respectively. In one embodiment, the first drive device 34 and second drive device 44 each include a rotating shaft having eccentric lobes thereon. In this embodiment, the first drive device 34 and the second drive device 44 may be coupled by a mechanism, such as a belt 52 for example, that is driven by a common motive device, such as an electric motor (not shown) for example. In another embodiment, the first drive device 34 and the second drive device 44 may each have separate motion devices (i.e. an electric motor) that provide the motion for the respective components. In this embodiment, the first drive device 34 and the second drive device 44 may be coupled for communication to allow synchronization and coordination of movement between the components of the needle bar assembly 24 and the second assembly 26. It should be further appreciated that the components of the needle bar assembly 24 and the awl bar assembly 26 are moved relative to the interior component 22 separately and independently from each other while maintaining the synchronization and coordination discussed herein below.

In one embodiment, the first drive device 34 and the second drive device 44 are contained within the housing 53 of the sewing apparatus 20 and driven by a common electric motor as noted above. The sewing apparatus 20 may be attached to an external robotic drive device 55 or other automated means of transport, such as an articulated arm having six degrees of freedom for example. It should be appreciated that the use of a robotic device allows the placement of the sewing apparatus containing the needle bar assembly 24 and the awl bar assembly 26 in a desired location and orientation relative to the interior component 22. In one embodiment, the use of a robotic arm provides advantages in allowing the movement of the sewing apparatus 20 over a thru-plane radius where the angle of the sewing apparatus 20 is changed to arrange the awl 30 normal to the surface of the interior component 22 without displacing the needle 40 when is it still engaged with the interior component 22.

Figure 2:
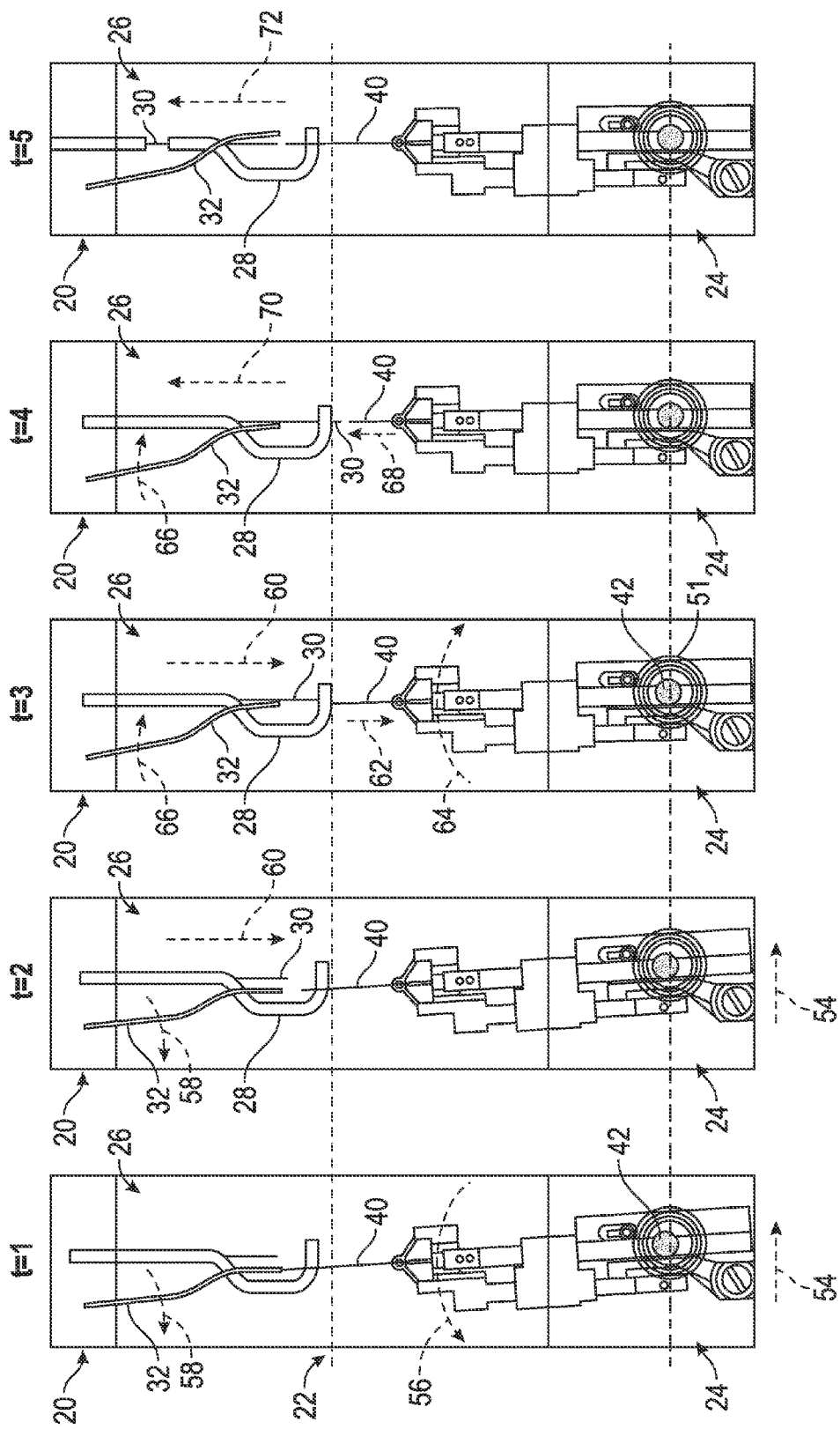
FIG. 2 is an illustration of the sewing apparatus of FIG. 1 at a series of time steps during operation.

Referring now to FIG. 2, the operation of the sewing apparatus 20 is illustrated for a series of time steps. The process starts at t=1 with the needle 40 engaged with the interior component 22 in a first position. The sewing apparatus 20 is moved in the direction indicated by the arrow 54 towards a second position. Since the needle 40 is still engaged, the needle bar assembly 24 rotates about the pivot 42 in the direction indicated by arrow 56. The thread tensioner arm 32 moves in the direction indicated by the arrow 58 to wrap thread (not shown) around the needle 40.

At t=2, the awl 30 moves from a retracted position in the direction indicated by arrow 60 towards the surface of the interior component 22. The walking foot 28 moves in the direction indicated by the arrow 60 towards the second position to bring the walking foot 28 against the surface of the interior component 22 prior to awl penetration. The needle 40 also initiates movement from the extended position towards a withdrawn position. It should be appreciated that while the needle 40 moves, the thread wrapped from the thread tensioner arm is carried by the needle 40.

At t=3, the awl 30 pierces the interior component 22 at the second position to form an opening in the interior component 22 sized to receive the needle 40. At this step, the needle 40 exits the opening in the interior component 22 at the first position by moving in the direction indicated by the arrow 62. As the needle 40 is withdrawn, a loop in the thread from the previous stitch is penetrated. The withdrawal of the needle 40 from the interior component 22 allows the needle bar assembly 24 to rotate in the direction indicated by 64 under a force from biasing member 45. The rotation of the needle bar assembly 24 aligns the needle 40 with the opening formed in the interior component 22 by the awl 30 in the second position. The thread tensioner arm 32 also initiates movement indicated by the arrow 66.

Starting with the needle 40 in the withdrawn position, at t=4 the needle 40 initiates movement toward the opening in the interior component in the second position as indicated by arrow 68. Similarly, the awl 30 also moves in the direction indicated by arrow 70 towards the retracted position. The thread tensioner arm 32 continues to move in the direction indicated by the arrow 66.

In the final step of this sequence, at t=5, the needle 40 extends through the opening in the interior component in the second position to a fully extended (top dead center) position. In this step, the thread tensioner arm 32 is moved to a position past or forward of the needle 40. The walking foot 28 is moved in the direction indicated by arrow 72 away from the interior component 22. The awl 30 also completes the movement in the direction of arrow 72 to a fully retracted (top dead center) position.

These sequence of steps (t=1 to t=5) are then repeated until the desired stitches are formed in the interior component 22. During operation, the interior component 22 remains in a fixed position relative to the sewing apparatus 20. It should be appreciated that while the sequence of steps is described as a series of discrete steps, the claimed invention should not be so limited. These steps may be part of a continuous motion of the sewing apparatus 20 in operation. Further, the movement of the components, such as the awl 30 and the needle 40 for example, may be sequential or simultaneous.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An apparatus for stitching an interior component, comprising:
    a first drive device;
    an awl bar assembly coupled to the first drive device, the awl bar assembly having an awl configured to be moved from a withdrawn position to an inserted position with the first drive device;
    a second drive device operably coupled to the first drive device;
    a needle bar assembly having a needle, the needle movable between an inserted and a withdrawn position, the needle bar assembly being pivotally coupled to the second drive device; and
    a biasing member coupled to the needle bar assembly, the biasing member being arranged to pivot and align the needle bar assembly in response to the needle being moved to the withdrawn position.

2. The apparatus of claim 1 where both first and second drives are contained within the same sewing assembly, which is transported along a stitch path from first position to second position via an external drive device such as a robot or other automated means of transport.

3. The apparatus of claim 1 wherein the first drive device is configured to move the awl from the withdrawn position to the inserted position at a first time.

4. The apparatus of claim 3 wherein the second drive device is configured to move the needle from the withdrawn to the extended at a second time, the second time being different than the first time.

5. The apparatus of claim 4 further comprising a thread tensioner arm adjacent the awl.

6. The apparatus of claim 5 further comprising a walking foot adjacent the awl.

7. The apparatus of claim 1 wherein the interior component is an interior trim piece of a vehicle.

8. The apparatus of claim 7, wherein the interior trim piece is a portion of an instrument panel of the vehicle.

9. The apparatus of claim 4 wherein the first drive device and the second drive device are operably coupled by a belt.

10. An apparatus for stitching an interior component, comprising:
    a first drive device;
    an awl coupled the first drive device and sized to form an opening in the interior component, the awl configured to be moved from a first position to a second position with an external drive device such as a robot or other automated means of transport;
    a thread tensioner arm coupled to the first drive device adjacent the awl;
    a second drive device operably coupled to the first drive device;
    a needle bar assembly having a needle, the needle movable between an inserted and a withdrawn position, the needle bar assembly being pivotally coupled to the second drive device, the needle bar assembly configured to be moved from the first position to the second position independent from the awl; and
    a biasing member coupled to the needle bar assembly, the biasing member being arranged to pivot the needle bar assembly into alignment with the opening formed by the awl at the second position, the biasing member pivoting the needle bar assembly in response to the needle being moved to the withdrawn position.

11. The apparatus of claim 10 wherein the external drive device is configured to move the awl from the first position to the second position at a first time.

12. The apparatus of claim 11 wherein the biasing member coupled to the needle bar assembly is configured to move the needle from the first position to the second position at a second time, the second time being different than the first time.

13. The apparatus of claim 12 further comprising a walking foot adjacent the awl.

14. The apparatus of claim 10 wherein the interior component is an interior trim piece of a vehicle.

15. The apparatus of claim 14, wherein the interior trim piece is a portion of an instrument panel of the vehicle.

16. The apparatus of claim 12 wherein the first drive device and the second drive device are operably coupled by a belt.

17. A method of stitching an interior component, comprising:
    forming a first hole with an awl, the awl coupled to a first drive device;
    inserting a needle into the first hole, the needle coupled to a needle bar assembly, the needle bar assembly being pivotally coupled to a biasing member;
    moving the needle bar assembly at a first time from a first position to a second position with an external drive device such as a robot or other automated means of transport while the needle is in the first hole;
    moving the awl at a second time to the second position with the external drive device, the second time being different from the first time;
    forming a second hole at the second position with the awl via the first drive device;
    moving the needle from the first hole to a withdrawn position via a second drive device; and
    pivoting the needle bar assembly when the needle is removed from the first hole to align the needle with the second hole via the biasing member.

18. The method of claim 17 wherein the needle bar assembly is moving toward the second position as the needle moves towards the withdrawn position.

19. The method of claim 18 wherein the awl forms the second hole as the needle bar assembly pivots to align the needle with the second hole.

20. The method of claim 19 further comprising:
    inserting the needle into the second hole; and
    moving the awl to a retracted position while the needle is inserted into the second hole.

* * * * *